Patented May 31, 1932

1,860,822

UNITED STATES PATENT OFFICE

ARTHUR STEVENS, OF BUFFALO, NEW YORK, ASSIGNOR TO U. S. INDUSTRIAL ALCOHOL CO., OF NEW YORK, N. Y., A CORPORATION OF WEST VIRGINIA

SOLVENTS AND THEIR APPLICATIONS

No Drawing.   Application filed July 23, 1929.  Serial No. 380,466.

This invention has to do with solvents for nitrocellulose and lacquer materials and the preparation of such solutions with solvents employing acetals.

Dimethyl acetal is a solvent for nitrocellulose, but the principal member of the group, diethyl acetal, or acetal, is a non-solvent. This accords with the general rule that for a given class of compounds, solvent power decreases or disappears with increase in molecular weight. The acetals are formed by reaction between alcohols and aldehydes (the latter themselves oxidation derivatives of alcohols), the reaction involving the separation of water; consequently the acetals will combine with water, with reformation of the alcohols and aldehydes. These considerations probably account for the fact that the acetals have not been employed industrially in the preparation of nitrocellulose and pyroxylin compositions for purposes such as the manufacture or production of films, threads and coatings.

This invention is based on the discovery that chain-compound acetals when mixed with alcohols, more especially anhydrous alcohols, either develop a latent solvent power, or show decidedly heightened or more beneficial solvent properties for purposes such as those indicated, and that, contrary to expectation, the acetal in these mixtures and solutions does not hydrolize, or if there is some decomposition the extent to which it takes place over a long period of time is so slight as to be inconsequential.

A new type of solvent of decided industrial value is thus provided, with which are obtained solutions of nitrocellulose capable of yielding strong, non-blushing films and threads or of forming durable, non-blushing lacquer surfaces. Favorable rate of evaporation, relatively low viscosity of the nitrocellulose solutions, and sufficient capacity of the solutions for dilution by hydrocarbons, are among the advantages of these solvents. A very practical consideration in their favor is low cost of production. The solvents themselves are clear, clean and of unobjectionable odor.

A typical and preferred example of the invention is the combination of diethyl acetal and anhydrous ethyl alcohol in varying proportions. Such a combination, while physically a mixture, acts practically as a new compound when employed as a solvent or gelatinizer for nitrocellulose. Neither the acetal nor the ethyl alcohol alone shows useful solvent properties for ordinary nitrocelluloses, but the mixture dissolves them readily, and films made from the solution are strong, clear and free from irregularities or blush. The solutions, moreover, are very favorable in respect to viscosity, are stable, exhibiting no shedding out when packed and stored in cans, and can be diluted to any necessary extent with appropriate hydrocarbons such as toluol or others. The solvent is miscible with all common solvents in all proportions.

The properties of the solvent are somewhat modified by varying the proportions of the ingredients. Generally speaking, the higher the proportion of alcohol to acetal, the greater will be the toleration of the eventual solutions to dilution. On the other hand, with higher proportions of acetal, solutions of lower viscosities are obtainable. Low viscosity of the solution is commonly considered to be an indication of the power of a solvent, and on the other hand great capacity of a nitrocellulose solution for dilution is also taken to show activity of the solvent. With these solvents, either kind of solvent power is available, and their behavior is such that a mixture giving sufficiently low viscosity together with a sufficiently high dilution ratio can be secured for any given purpose.

The proportions of acetal and alcohol in the solvent may be varied from about 30% acetal and 70% alcohol to about 70% acetal and 30% alcohol, depending upon the nitrocellulose to be dissolved and the specific purpose in view, but this is not intended to be limiting. With 32.5% acetal to 67.5% alcohol, a constant boiling mixture having a boiling point around 79° C. is obtained. Proportions given are by weight.

Generalizing rather broadly, the dilution ratio with respect to hydrocarbons seems to be the greatest when the solvent has this approximate constitution, say from about 25%–35% acetal, and generalizing in the same way, the solvent mixtures containing about 50%–60% acetal to 50%–40% alcohol appear to have the most solvent power for various nitrocelluloses. A mixture containing about equal parts of the two ingredients is suitable as a prepared solvent for most commercial and industrial uses.

Other primary and secondary alcohols, such as methyl, propyl, butyl, amyl alcohols, etc., may be employed. Likewise other chain-compound acetals derived from formaldehyde, propionic aldehyde, butyric aldehyde, etc., and the corresponding or different alcohols may be utilized.

The new solvents may be composed of mixtures of different acetals and an alcohol or alcohols. For illustration, the presence of a small amount of dimethyl acetal in a solvent mixture of diethyl acetal and alcohol increases the solvent action to a very marked degree. For example, a proportion of dimethyl acetal as small as 1% by weight of the total weight of a solvent composed of diethyl acetal, dimethyl acetal and anhydrous ethyl alcohol, in which the proportion of diethyl acetal may be as low as about 15%, is sufficient to enable such a mixture to dissolve completely a grade of nitrocellulose which could not be dissolved, or could not be dissolved satisfactorily, in a similar mixture of diethyl acetal and alcohol only.

In the case of a ternary mixture of alcohol, diethyl acetal and dimethyl acetal, the diethyl acetal, as such, is a non-solvent for nitrocellulose, or is a latent solvent, whereas the dimethyl acetal is a direct solvent. The incorporation in the mixed solvents of this invention of other direct solvents for nitrocellulose has a similarly beneficial effect upon the solvent action. Thus, the presence of a small amount of ethyl acetate in a mixture of acetal and ethyl alcohol gives increased solvent power.

Specifically, the use of even very small amounts of dimethyl acetal, or other direct solvent, along with diethyl acetal (for example) and alcohol, makes it possible to get low viscosities in the nitrocellulose solutions notwithstanding the use of a large amount of the alcohol, which large amount of alcohol permits, at the same time, especially high dilution of the solutions with hydrocarbons. In other words, the combination of higher and lower acetals, or of a non-solvent acetal and a direct solvent, with alcohol, affords greater facility for securing nitrocellulose solutions having desired properties in desired degrees for various purposes.

From another point of view the addition of a suitable amount of a direct solvent, makes it possible to compound these acetal-alcohol solvents with materially more of the alcohol part and materially less of the acetal part than would otherwise produce satisfactory results.

The solvents of this invention have also a good range of solubility for resin, shellac, kauri, ester gums and other materials used in the varnish and lacquer industry, and are otherwise suitable for such purposes.

It will naturally be understood that in compositions prepared with the solvents of the invention, from which to form films or threads, as also lacquering or coating compositions made herewith, there may be included, in accordance with known practice, various auxiliary solvents or materials, to modify, for example, the rate and period of evaporation, suitable plasticizers, diluents as heretofore indicated, etc.

The solvents provided by this invention are likewise applicable to the manufacture of semi-solid solutions of pyroxylin or nitrocellulose, commonly termed plastics.

I claim:

1. A solvent for nitrocellulose comprising a mixture of alcohol, diethyl acetal and dimethyl acetal.

2. A solvent for nitrocellulose comprising a mixture of alcohol, a minor amount of diethyl acetal, and a very small proportion of dimethyl acetal.

ARTHUR STEVENS.